UNITED STATES PATENT OFFICE.

MICHAEL BARRETT, OF TORONTO, CANADA WEST.

IMPROVED PROCESS FOR THE RECOVERY AND PURIFICATION OF SULPHURIC ACID USED IN REFINING PETROLEUM, &c.

Specification forming part of Letters Patent No. 59,531, dated November 6, 1866.

*To all whom it may concern:*

Be it known that I, MICHAEL BARRETT, of Toronto, in the Province of Canada West, have discovered a new and useful process for the recovery, purification, and revivification of sulphuric acid spent and deteriorated in the refining of petroleum, coal, and shale oils; and I do hereby declare that the following is a full and exact description of said process.

The spent and deteriorated acid as it comes from the agitator is to be received in a lead-lined vessel and heated to 212° of Fahrenheit's thermometer, which causes any oil that may have been drawn off with the sulphuric acid to come to the surface. This oil is to be removed. The spent acid in the same vessel is then to be treated with finely-powdered black oxide of manganese, in the proportion of half an ounce of the manganese to one pound of acid, and heat applied by means of a steam-jacket or otherwise for six hours. The effect will be that the oxygen gas evolved by the action of a portion of the sulphuric acid upon the black oxide of manganese will combine with the bituminous or tarry matter contained in the spent acid, causing it to rise to the surface upon cooling. The bituminous or tarry matter having been removed, there is to be added to the acid a mixture of alumina and water, prepared by mixing one pound of Fuller's earth or pure clay with one gallon of water. Of this mixture of alumina one gallon is to be added to every ten gallons of the acid, and the mixture to be boiled. Upon cooling, any remaining bituminous or tarry matter will have come to the surface and must be removed. In the course of five hours the alumina will be precipitated, together with all remaining impurities, and a clear liquid will be obtained.

The clear liquid is to be carefully drawn off from the aluminous sediment, and concentrated by any of the methods usually employed in the concentration of sulphuric acid.

The acid thus obtained is pure sulphuric acid, and fitted for every purpose to which sulphuric acid can be applied.

What I claim as my discovery, and desire to secure by Letters Patent, is—

The recovery, purification, and revivification of the sulphuric acid spent and deteriorated in the process of refining petroleum, coal, and shale oils, by means of oxygen gas in the nascent state, by whatever means developed or obtained.

MICHAEL BARRETT.

Witnesses:
 I. A. VERPLANCK,
 GEORGE C. WEBSTER.